US009254936B2

(12) United States Patent
Cho et al.

(10) Patent No.: US 9,254,936 B2
(45) Date of Patent: Feb. 9, 2016

(54) FLUID ACTIVATABLE ADHESIVE FOR GLUE-FREE, LINER-FREE, LABELS FOR GLASS AND PLASTIC SUBSTRATES AND METHODS OF USE THEREOF

(71) Applicant: NuLabel Technologies, Inc., East Providence, RI (US)

(72) Inventors: Daniel Cho, Pawtucket, RI (US); Heidi Munnelly, Cumberland, RI (US); Benjamin Lux, Providence, RI (US)

(73) Assignee: NuLabel Technologies, Inc., East Providence, RI (US)

( * ) Notice: Subject to any disclaimer, the term of this patent is extended or adjusted under 35 U.S.C. 154(b) by 0 days.

(21) Appl. No.: 14/310,913

(22) Filed: Jun. 20, 2014

(65) Prior Publication Data

US 2015/0367977 A1    Dec. 24, 2015

(51) Int. Cl.
| | |
|---|---|
| C09J 7/02 | (2006.01) |
| B65C 3/08 | (2006.01) |
| B32B 37/00 | (2006.01) |
| C09D 133/02 | (2006.01) |
| C09D 125/08 | (2006.01) |
| C09D 135/06 | (2006.01) |
| C09J 7/04 | (2006.01) |
| G09F 3/02 | (2006.01) |

(52) U.S. Cl.
CPC ............. *B65C 3/08* (2013.01); *B32B 37/0038* (2013.01); *C09D 125/08* (2013.01); *C09D 133/02* (2013.01); *C09D 135/06* (2013.01); *C09J 7/042* (2013.01); *C09J 2425/00* (2013.01); *G09F 2003/025* (2013.01)

(58) Field of Classification Search
CPC ...... C09J 7/042; C09J 7/041; G09F 2003/025
USPC ............................................. 156/305, 308.6
See application file for complete search history.

(56) References Cited

U.S. PATENT DOCUMENTS

| | | | |
|---|---|---|---|
| 3,296,723 A | 1/1967 | Johannes | |
| 3,351,515 A | 11/1967 | Muttera, Jr. | |
| 3,531,316 A | 9/1970 | Sternasty | |
| 4,507,670 A * | 3/1985 | Motosugi | B41M 5/3333 503/208 |
| 4,820,773 A * | 4/1989 | Alexander | A61L 15/60 264/140 |
| 6,062,062 A | 5/2000 | Toida | |
| 6,210,795 B1 | 4/2001 | Nelson | |
| 6,298,894 B1 | 10/2001 | Nagamoto | |
| 6,306,242 B1 | 10/2001 | Dronzek | |
| 6,517,664 B1 | 2/2003 | Dronzek, Jr. | |
| 6,656,319 B1 | 12/2003 | Boyd | |
| 6,663,746 B2 | 12/2003 | Dronzek | |
| 7,122,597 B2 | 10/2006 | Calienni | |
| 7,943,714 B2 | 5/2011 | Schnieders | |
| 8,334,335 B2 | 12/2012 | Lux | |
| 8,334,336 B2 | 12/2012 | Lux | |
| 8,716,372 B2 | 5/2014 | Lux | |
| 8,716,389 B2 | 5/2014 | Lux | |
| 2004/0038026 A1 | 2/2004 | Li | |
| 2005/0284566 A1 | 12/2005 | Wagner | |
| 2007/0119542 A1 | 5/2007 | Williams | |
| 2008/0060756 A1 | 3/2008 | Schnieders | |
| 2009/0136773 A1 | 5/2009 | Ghosh | |
| 2009/0169780 A1 | 7/2009 | Kimura | |
| 2009/0288759 A1 | 11/2009 | Topfer | |
| 2011/0033698 A1 | 2/2011 | Woods | |
| 2012/0059103 A1* | 3/2012 | Lux et al. | ............ 524/388 |
| 2014/0045976 A1 | 2/2014 | Lux | |
| 2014/0190631 A1 | 7/2014 | Cho | |

FOREIGN PATENT DOCUMENTS

| | | |
|---|---|---|
| DE | 3508150 | 10/1985 |
| DE | 29902548 | 5/1999 |
| DE | 29902549 | 5/1999 |
| DE | 19852008 | 5/2000 |
| DE | 19905468 | 7/2000 |
| DE | 19962582 | 7/2000 |
| EP | 267619 | 5/1988 |
| EP | 312037 | 4/1989 |
| EP | 503112 | 9/1992 |
| GB | 1333710 | 10/1973 |
| JP | 2004240029 | 8/2004 |
| WO | 9919412 | 4/1999 |
| WO | 0214448 | 2/2002 |
| WO | 0245054 | 6/2002 |
| WO | 2006000424 | 1/2006 |
| WO | 2007077036 | 7/2007 |
| WO | 2009024357 | 2/2009 |
| WO | 2012109140 | 8/2012 |
| WO | 2012109148 | 8/2012 |
| WO | 2014109983 | 7/2014 |

OTHER PUBLICATIONS

International Search Report and Written Opinion PCT/US2012/023964 mailed Mar. 18, 2013.
International Search Report and Written Opinion PCT/US2012/023982 mailed Mar. 11, 2013.
Database WPI, Thomson Scientific, XP-002743905, 2 pages.
International Search Report and Written Opinion mailed Sep. 11, 2015 in connection with the related PCT application, PCT/US2015/037000.

* cited by examiner

*Primary Examiner* — Scott W Dodds
(74) *Attorney, Agent, or Firm* — Pabst Patent Group LLP

(57) ABSTRACT

Methods for applying a liner-free, or liner-less label, to a substrate, particularly glass or plastic (e.g., polyethylene terephthalate) substrates, are described herein. The method includes applying an adhesive composition, such as a polymeric coating, to a label face sheet, activating the adhesive composition with an activating fluid, and contacting the label to the substrate. The activating fluid is preferably a mixture of water and one or more organic solvents, such as low molecular weight alcohols.

20 Claims, No Drawings

FLUID ACTIVATABLE ADHESIVE FOR GLUE-FREE, LINER-FREE, LABELS FOR GLASS AND PLASTIC SUBSTRATES AND METHODS OF USE THEREOF

FIELD OF THE INVENTION

This invention is in the field of automated labeling systems for glass and plastic substrates, such as food and beverage containers and containers for pharmaceuticals.

BACKGROUND OF THE INVENTION

Plastic and glass containers or bottles are prevalent in a wide variety of shapes and sizes for holding many different types of materials such as detergents, chemicals, motor oil, beverages, etc. These containers are glass or plastic (mono or multi layers) of polyethylene, polypropylene, polyester or vinyl along with other specialty blends for specific barrier and product resistance performance. These containers are typically provided with a label which designates the trade name of the product and may contain other information.

Labels designed to adhere to glass and/or polyethylene terephthalate (PET) are typically applied using a cold or hot glue application processes. During the automated bottle labeling, glue (high viscosity, tacky liquid) is directly applied to the preprinted label and then applied to the bottle. The use of glues, however, requires extensive cleaning as the glue dries and accumulates on the bottling line equipment. In some cases, the glue must be heated prior to application, which requires additional heating equipment and increases energy costs.

In addition to cold- and hot-glue applied labeling methods, preprinted pressure sensitive adhesive (PSA) labels are also used. These labels utilize a release liner to protect the preprinted label face from interacting with the tacky PSA. The use of traditional PSA labels results in several million pounds of liner waste per year in the bottling industry. PSAs also lack removability properties desirable in downstream recycling and bottle reusing facilities.

Attempts to overcome these limitations have been described in the literature. U.S. Pat. Nos. 6,306,242; 6,517,664; and 6,663,746 to Dronzek describe a labeling system for applying labels to plastic and glass bottles. The labeling system includes applying a layer of a hydrophilic solid material to a polymeric label to form a hydrophilic layer on the polymeric label; applying water, water containing a cross-linking agent or a water based adhesive over the hydrophilic layer to form a fastenable polymeric label; fastening the fastenable polymeric label to a glass, plastic or metal container or surface; and curing the polymeric label on the glass, plastic or metal surface or container.

U.S. Pat. No. 7,943,714 to Schneiders describes a labeling system containing a blend of two or more polymers having different hydrophilicities or using a polymer with repeat units having carboxylic, sulfonic or phosphonic acid groups and/or their salts.

Dronzek and Schneiders require the use of non-porous or relatively non-porous face sheets, such as polypropylene, high/low density polyethylene, polyethylene terephthalate, polystyrene, polycarbonate, vinyl and compatibilized blends. Face sheets prepared from these materials typically have a moisture vapor transmission rate of less than about 150 g/m$^2$/24 hr as measured using the TAPPI T448 om-09 standard protocol. In fact, Schneiders discloses that the use of porous face sheets, i.e., those having high moisture vapor transmission rates (MVTR) values, with pressure sensitive adhesives is undesirable because the finished labels exhibit poor wet tack and swimming. Similar disadvantages are described in Dronzek.

There exists a need for a clean, liner-free labeling solution for glass and polyethylene terephthalate (PET) automated bottle labeling applications that provides long term label to bottle adhesion when dry and long term adhesion when exposed to ice water condition for extended time periods, particularly for substrates having high MVTR values.

Therefore, it is an object of the invention to provide improved liner-free labels that provide long-term adhesion to a desired substrate, but can be readily removed when needed, such as in standard recycling or reuse facilities.

It is yet a further object of the invention to provide improved methods for applying a liner-free label to a substrate.

It is a further object of the invention to provide a clean, glue-free, liner-free labeling solution for glass and polyethylene terephthalate (PET) automated bottle labeling applications that provides long term label to bottle adhesion when dry and long term adhesion when exposed to ice water conditions for extended time periods.

It is also an object of the invention to provide a clean, glue-free, liner-free labeling solution for glass and polyethylene terephthalate (PET) automated bottle labeling applications that provides long term label to bottle adhesion when dry and long term adhesion when exposed to ice water conditions for extended time periods wherein the labels can be readily removed when necessary using methods readily available in bottle recycling and reuse facilities.

SUMMARY OF THE INVENTION

Methods for applying a liner-free, or liner-less label, to a substrate, particularly glass or plastic (e.g., PET) substrates are described herein. The method includes applying an adhesive composition, such as a polymeric coating, to a label face sheet, activating the adhesive composition with an activating fluid, and contacting the label to the substrate. The activating fluid is preferably a mixture of water and one or more organic solvents, such as low molecular weight alcohols. In some embodiments, the face sheet has an MVTR value of at least about 160, 170, 175, 180, 185, 190, 195, or 200 g/m$^2$/24 hr.

In some embodiments, the adhesive composition contains a blend or mixture of polymers, such as homopolymers, copolymers, terpolymers, etc., and combinations thereof. In particular embodiments, the blend or mixture contains a non-blocking resin in a continuous film that provides a non-blocking surface and an emulsion/dispersion polymer which provides adhesion to the substrate. The blend of the emulsion/dispersion polymer into the non-blocking resin disrupts the polymer film and allows for improved activation of the film by the activation spray.

Volatile-base neutralized resin solutions are used to prepare aqueous solutions of the resin that dries to form a water-insoluble film due to the evaporation of the base. The resin provides the desired ice water resistance. The use of a non-volatile base that remains in the polymeric film results in a loss of ice water resistance. The sensitivity of the resin to base allows for caustic removability of the label due to the dissolution of the polymer in the base, which is important for recycling and removal applications.

The moderate to high acid number of the resin provides the base solubility needed to allow for the use of a water-based solution combined with the caustic removability. The higher acid number allows for ice water resistance as well. Lower acid number resins typically have less resistance to ice water, especially over longer durations, such as 24-72 hours or longer.

In other embodiments, the adhesive composition contains a copolymer containing at least two monomers with different hydrophilicities. The more hydrophilic monomer is referred to as "the hydrophilic monomer" and the more hydrophobic monomer is referred to as "the hydrophobic monomer". The hydrophilic and hydrophobic monomers are selected to allow the at least one hydrophilic monomer to have a characteristic of quick tack when exposed to a hydrophilic solvent, such as water or other aqueous solvent, while the at least one hydrophobic monomer has a characteristic which enables strong adhesion to a paper or polymeric substrate. Alternatively, independent polymers with hydrophilic and hydrophobic functionality can be blended in various ratios yielding polymeric mixtures with hydrophobic and hydrophilic functionality.

The adhesive composition may contain hygroscopic particulate fillers which enable fast exhaustion of the activation fluid out of the adhesive when applied to a substrate. This allows the hydrophobic monomers of the adhesive composition to achieve a strong adhesive bond between the face sheet and substrate. The particulate fillers may also provide fast absorption of the activation fluid composition into the full thickness of the adhesive composition and rapid swelling of not only the hydrophilic part, but also the hydrophobic part, of the adhesive composition. The particulate fillers may also function as anti-blocking agents when liner-free label media are tightly wound in a roll or stacked.

The compositions described herein can quickly go from a non-tacky to a tacky state enabling the use of solvent-activated glue-free, liner-free labels for label printing and labeling that require both quick tack and strong adhesion. The activating fluid is non-tacky, dries clean, and requires no additional maintenance or clean up, e.g., to remove glue from the labeling machinery. The ability of the non-tacky adhesive layer to be applied before, during, or after label printing allows for flexibility in the work flow and customization of the system. Further, applying the adhesive layer as a coating during the printing of the label provides manufacturing efficiencies resulting in waste and cost reduction. In certain embodiments, the adhesive is engineered to be compatible with application methods that are typically used to print labels. This includes, but is not limited to, flexographic, gravure, and offset printing methods. The resulting system allows a standard printing press to be able to both print colors and coat adhesive onto a web or sheet label in a single pass.

The adhesive compositions described herein may be used not only on paper, cardboard, particle board, medium density fiberboard, wood, manufactured wood products, and metal substrates, but also on glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyester, polyvinyl chloride (PVC) and polyvinyl chloride films, and TYVEK®, as well as other low energy and thermoplastic substrates.

The performance of the adhesive can be evaluated using a variety of assays including block resistance, peel strength and percent fiber tear at 2 and 10 minutes, and tunneling and/or swimming when immersed in an ice bath for 24 hours to 72 hours. The performance of the adhesive in the peel strength and immersion assays can vary depending on the activating fluid used to activate the adhesive.

In some embodiments, the composition provides fair, good, or excellent, preferably good or excellent, heat seal blocking resistance and/or pressure blocking resistance; fair, good, or excellent, preferably good or excellent peel strength on PET and/or glass when activated by a cosolvent and/or water; and resists swimming, tunneling, and/or edge lifting for at least 20 minutes, 1 hour, or two hours when immersed in an ice water bath.

The assays described herein qualitatively or quantitatively describe the performance characteristics of the adhesive compositions. For example, in some embodiments, the peel strength of the adhesive on PET and/or glass when activated by an activating fluid, such as 30% n-propanol (nPA), 30% isopropanol (IPA), or 10% nPA is greater than about 100 grams/inch within about 5 minutes of application to a substrate, preferably greater than about 200 grams/inch within about 2 minutes of application to a substrate, more preferably greater than about 200 grams/inch within about 1 minute of application to a substrate. The activating fluid then distributes into the hydrophobic regions resulting in their swelling and ultimate adhesion to the substrate. This adhesion to the substrate results in average peel test values in the range from about 100 grams/inch to about 1,000 grams/inch, preferably from about 200 grams/inch to about 1,000 grams/inch, more preferably from about 400 grams/inch to about 1,000 grams/inch.

Alternatively, the adhesive can be evaluated using the fiber tear test. In some embodiment, the labels exhibit a paper tear greater than about 50, 55, 60, 65, 70, 75, 80, 85, 90, or 95% after one, two, three, four, five, six, seven, eight, nine, or 10 minutes or longer. In particular embodiments, the labels exhibits a paper tear greater than 60, 65, 70, 75, 80, 85, 90, or 95% after two minutes and 10 minutes. These tear strengths can be achieved using paper-based or polymer or synthetic based face sheets. However, these tear strengths are often unnecessarily high for polymer and synthetic based face sheets.

Kits containing the adhesive formulations are also described herein. The kit can contain only the adhesive formulation. The kits can contain the adhesive formulation and uncoated labels. The kits can contain paper or synthetic (polymeric film) labels which have been coated with the adhesive formulation and the activating fluid. The kits can contain coated labels, activating fluid, and an activation apparatus used to apply the activating fluid to the solvent-sensitive adhesive layer.

The compositions, methods, and kits described herein offer significant ecological benefits compared to the prior art as well as products currently commercialized in particular markets. For example, the compositions, methods, and kits described herein eliminate the liner backing which is a waste byproduct of liner-backed pressure sensitive adhesive labels. This reduces landfill waste and eliminates the energy and carbon emissions from the production of liner backing and the shipment of the material to suppliers and customers.

In addition, the compositions, methods, and kits described herein eliminate the silicone release layer which is either disposed of on the liner backing in liner-backed pressure sensitive adhesive labels or on the top of the printed layer of liner-less pressure sensitive adhesive labels. In either existing art, the silicone presents an energy intensive manufacturing process and the addition of a petrochemical derivative product that is unnecessary and eliminated by the compositions, methods, and kits described herein, thereby reducing the carbon footprint of the label and the requirement for silicone to be utilized in the label manufacturing process. The system described herein also eliminates the need for wet or hot glue application processes as described above, which avoids the necessary extensive cleaning as the glue dries and accumulates on the bottling line equipment.

The labeling system described herein provides labels which exhibit sufficient peel strength to glass and/or plastics, such as PET, and removability properties which are desirable in downstream recycling and bottle reusing facilities.

DETAILED DESCRIPTION OF THE INVENTION

I. Definitions

"Hydrophilic", as used herein, refers to one or more monomers or polymers (e.g., homopolymers or copolymer) in the adhesive composition or mixture having a greater affinity for water than one or more other monomers or polymers (e.g., homopolymers or copolymer) in the adhesive composition or mixture. Hydrophilicity can be quantified by measuring its partition coefficient between water (or a buffered aqueous solution) and a water-immiscible organic solvent, such as octanol, methylene chloride, or methyl tert-butyl ether. If after equilibration a greater concentration of the compound is attained in water than in the organic solvent, then the compound is considered hydrophilic.

Hydrophilicity can also be evaluated using water contact angle. Generally, hydrophilic surfaces exhibit a water contact angle of less than about 90°.

"Hydrophobic", as used herein, refers to one or more monomers or polymers (e.g., homopolymers or copolymer) in the adhesive composition or mixture having less affinity for water than one or more other monomers or polymers (e.g., homopolymers or copolymer) in the adhesive composition or mixture. Hydrophobicity can be quantified by measuring its partition coefficient between water (or a buffered aqueous solution) and a water-immiscible organic solvent, such as octanol, methylene chloride, or methyl tert-butyl ether. If after equilibration a greater concentration of the compound is attained in the organic solvent than in water, the compound is considered hydrophobic. Hydrophobicity can also be evaluated using water contact angle. Generally, hydrophobic surfaces exhibit a water contact angle of greater than about 90, 95, 100, 105, or 110°.

"Tack" or "quick tack", as used herein, refers to instantaneous or nearly instantaneous formation of a bond between an adhesive and surface when brought into light contact for a very short period, e.g., less than five second. Tack properties are dependent, at least in part, on the viscoelastic flow characteristics of the polymer adhesive system. In a system where a volatile solvent-based activation method is being employed, it is possible for the system to possess initial tack when the adhesive is in a moist state and no tack (but still be well adhered to a substrate through adhesive bonding) once the moisture has evaporated or been removed. Tack is particularly relevant where bonds must immediately sustain forces after assembly. Tack forces are particularly significant in maintaining bond strength to low surface energy substrates when chemical or mechanical bonding processes do not readily occur. Tack measurement methods are typically application specific, however the Standard Test Method for Tack of Pressure-Sensitive Adhesives by Rolling Ball (D3121-06) as developed by the American Society for Testing and Materials (ASTM) provides a reliable measurement method. In this method a ball of a fixed size is rolled down a ramp of a fixed height and propelled onto a tacky label. The distance the ball travels across the label provides a measure of tack. "No tack" or "non-tacky" means that there is no such instant contact bond or adhesion between the adhesive and the substrate.

"Blocking" refers to the formation of a bond between the adhesive layer of the label and the face of an adjacent label when the label is in roll or stacked form.

"Adhesion" or "adhesive bonding", as used herein, refers to the longer term bond between the adhesive and the substrate and/or another adhesive. Adhesion, unlike tack, focuses on the bond created between a surface and a substrate (which can also be another adhesive) that is not dependent upon the viscoelastic flow characteristics of the adhesive.

Good adhesive tack (the combination between adhesion and tack) is achieved when the adhesive strength is greater than the cohesive strength of the adhesive system. A bond of adequate strength can be formed and maintained using adhesive forces, tack forces, or a combination of the two; however, bond formation is not limited by these forces. Peel strength is a force measure of both tack and adhesive forces. ASTM Standard D3330 (Standard Test Method for Peel Adhesion of Pressure-Sensitive Tape) provides an accurate measure of peel strength. For a particular substrate, average peel test values range from about 100 grams/inch to about 1,000 grams/inch, preferably from about 200 grams/inch to about 1,000 grams/inch, more preferably about 400 grams/inch to about 1,000 grams/inch to achieve adequate adhesion.

"Open time" as used herein, refers to the amount of time between the activation of the adhesive and the application of the label to a substrate.

"Resin", as used herein, generally refers to polymeric solutions that consist of a single phase, as in a solution of the polymer dissolved in a solvent. When cast into a film, these materials can form a continuous phase as the solvent evaporates.

"Emulsion/dispersion polymer", as used herein, generally refers to liquids consisting of a continuous aqueous phase in which polymeric particles are distributed. The term "emulsion" is used to refer to such solutions where the polymer is dispersed as a liquid or in a high flow/soft state. In contrast, dispersions refer to such solutions in which the polymer is dispersed as a hard solid. When the film is cast, the polymeric particles can coalesce to form a continuous film or remain as discreet particles.

"Non-blocking", as used herein, generally refers to the property of a polymeric film to show no tendency to form a bond between the adhesive layer of the label and the top of an adjacent label when the label is in roll or stacked form.

"Acid number", as used herein, refers to the mass of potassium hydroxide (KOH) in milligrams that is required to neutralize one gram of the polymer or polymers. The acid number is a measure of the amount of carboxylic acid groups in the polymer(s). In a typical procedure, a known amount of sample is dissolved in organic solvent and titrated with a solution of potassium hydroxide of known concentration and containing a color indicator.

II. Methods for Applying Glue-Free, Liner-Free Labels to Glass or Plastic Substrates Methods for applying a liner-free, or liner-less label, to a substrate, particularly glass or plastic (e.g., PET) substrates are described herein. The method includes applying an adhesive composition, such as a polymeric coating, to a label face sheet, activating the adhesive composition with an activating fluid, and contacting the label to the substrate. The activating fluid is preferably a mixture of water and one or more organic solvents, such as low molecular weight alcohols.

A. Face Sheets

Unlike other water and solvent activated labels and adhesive systems, the adhesive compositions described herein can be applied to a variety of face sheets, with a variety of MVTR of the face sheet. In particular embodiments, the MVTR of the face sheet is at least about 160, 170, 175, 180, 185, 190, 195, or 200, 210, 220, 225, 230, 240, 250, 260, 270, 275, 280, 290, 300, 325, 350, 400, 425, 450, 475, 500, 525, 550, 575, or 600 g/m$^2$/24 hr as measured using TAPPI T448 om-09 standard protocol. MTVR for uncoated paper is reported at 620-670 g/m$^2$/24 hr.

Suitable face sheets include, but are not limited to, paper, coated one side paper, coated two side paper, top-coated and non-top-coated grades of direct thermal paper, thermal transfer paper, polymer films, woven and non-woven synthetic materials, wood, manufacture wood products, metal films, composite films, plastics (i.e. polyester, polypropylene, or polyethylene), metalized paper, and mylar. In some embodiments, the faces sheet is a laminate, such as used to apply to furniture. The face sheet for furniture lamination can be formed from any suitable laminate material, including but not limited to, wood, manufacture wood, and synthetic materials. In some embodiments, the face sheets can be printed on with a suitable printing device. In other embodiments, the adhesive side of the label can receive dye/ink/pigment from a printing device, for example, printer registration marks. In particular embodiments, the face sheet is printed or printable paper or printed or printable polymeric film.

B. Substrates

The adhesive compositions described herein can be used to adhere coated labels to a variety of substrates. Suitable substrates include, but are not limited to, paper, cardboard, particle board, medium density fiberboard, wood, manufacture wood products, and metal, glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyester, polyvinyl chloride (PVC) and polyvinyl chloride films, and TYVEK®, as well as other low energy and thermoplastic substrates. Other substrates include porous substrates, such as natural or synthetic textiles and cellulosic fiber-based substrates. In particular embodiments, the substrate is glass or plastic, particularly PET.

In some embodiments, the adhesives are designed to adhere to a single specific substrate but do not adhere to other substrates. In one embodiment, the adhesive can be designed to have a specific strength of adhesion and/or mode of failure. For example, the adhesive bond has a lower failure point than the construct of the face sheet. In other embodiments, the adhesive is designed to adhere to a variety of substrates with little or no modification of the adhesive formulation.

The adhesive composition (or blend) can be applied to the above-listed face sheets utilizing typical web coating methods including, but not limited to, knife over roll, gravure, reverse-gravure, metering rod, slot die, and air knife coating methods.

The coat weight of the adhesive composition on the face sheet is largely dependent upon the end use application of the solvent sensitive adhesive label. To reduce cost, coat weights of 3 dry grams of adhesive per square meter are typically used. However, coat weights up to 25 dry grams per square meter may be also be used. Preferred coat weight ranges between 6 dry grams of adhesive per square meter to 12 dry grams of adhesive per square meter.

After the application of the adhesive composition to the face sheet web, the remaining water and solvent is extracted from the adhesive composition. This may be accomplished using conventional methods including, but not limited to, air flotation oven, roller supported web oven, and energy cure methods (for example, infrared heaters and dryers).

Optionally, it may be desirable to coat thermally activated paper and films. Care must be taken in adhesive selection to ensure that the components formulating the adhesive composition do not contain certain chemistries or solvents that negatively interact with the embedded thermal dye. In addition, during the drying (or solvent removal) process, the heat or energy from the process should not activate the thermal paper (a processes known as imaging).

Sometimes the coating of a web with an adhesive can induce a phenomenon known as a shape memory or curling. As it is often important for end applications that labels have lay flat properties, a number of additives can be added to the adhesive formulation to prevent curl, as described earlier. Suitable curl preventing additives include, but are not limited to glycerol, ethylene glycol, propylene glycol, or polyethylene glycol (molecular weight range from 150 to 10,000). In addition, mechanical methods can be employed to reduce curl, such as a bending bar or mechanical embossing. Also, the addition of vaporized water (or other liquid vapors) to the non-adhesive coated side of the label can have dramatic effects in reducing curl.

C. Coated Labels

In one embodiment, the final product is a label having three layers: a first layer which is printable, a second layer of face stock material, and then a third layer of adhesive composition described herein, e.g., coated on one surface of the face stock. Preferably, there is a continuous phase composed of a homogenous mix of all adhesive polymers with a uniform dispersion of the filler. In some embodiments, the filler particles are localized to the surface of the film; in others, they are localized to the interface between the paper and the adhesive or distributed uniformly in the z-axis. In all embodiments, the adhesive portion of the liner-free label is in a non-tacky state prior to activation by the activating solution.

Adhesive compositions containing one or more of the copolymers described herein exhibit higher peel strengths, particularly on glass and plastic substrates, such as PET, than materials containing one or more hydrophilic or one or more hydrophobic materials alone.

D. Adhesive Compositions

The adhesive compositions described herein can contain a single polymer (e.g., homopolymers, copolymer, terpolymer, etc.) or a mixture of polymers, such as homopolymers, copolymers, terpolymers, etc., and combinations thereof. Additives, such as hygroscopic particulate fillers, can be incorporated into the adhesive composition for the generation of both quick tack and longer term adhesion upon activation by an aqueous or solvent-based solution for adhesion to a variety of substrates, such as paper, cardboard, metal, as well as glass and plastics, particularly glass and polyethylene terephthalate substrates, such as bottles.

Hygroscopic agents (e.g., particulate fillers) in the adhesive formulations can modulate the kinetics of the distribution of water and/or the activation fluid throughout the adhesion composition to achieve the desired adhesive behavior and performance of the glue-free, liner-free label. Kinetics may also be modified by the degree of hydrophilicity and hydrophobicity of the polymers in the adhesive layer.

1. Polymer Blends/Mixtures

In one embodiment, the adhesive composition contains a blend or mixture of a polymeric resin and an emulsion/dispersion polymer. The polymers can be homopolymers, copolymers, terpolymers, etc., and combinations thereof. In particular embodiments, the blend or mixture contains a non-blocking resin in a continuous film that provides a non-blocking surface and an emulsion/dispersion polymer which provides adhesion to the substrate. The blend of the emulsion/dispersion polymer into the non-blocking resin disrupts the polymer film and allows for improved activation of the film by the activation spray.

a. Polymeric Resin

The blends typically contain a continuous phase, film-forming polymeric resin. The resin should be non-blocking. The film-forming polymeric resin can be water-soluble or insoluble, alkali soluble, or combinations thereof. In particular embodiments, the resin is water-insoluble which provides resistance to label removal when immersed in a cold water bath but is alkali soluble which allows for removal of the label facilitating recycling of the substrate (e.g., glass or plastic container, such as a bottle).

The resin polymer should form a continuous phase in which the other components of the adhesive composition (e.g., emulsion or dispersion polymer, etc.) will be dispersed when dried. This arrangement allows for any tack found in the emulsion/dispersion polymers to be hidden from the surface of the film by the continuous phase polymer, which will prevent blocking. These polymers should be non-tacky and either fully or partially soluble in the activation spray.

For increased humidity resistance, resin polymer or polymers that are soluble in alkaline or acidic aqueous environments, but insoluble in aqueous environment at neutral pH, and have some sensitivity to solvent is preferred since environmental moisture will have no effect on their physical properties. The pH-dependent solubility of the resin polymers improves coating stability and sensitivity to solvent facilitates activation.

Suitable resins include, but are not limited to, styrene-maleic anhydride resins, esters of styrene-maleic anhydride resin, styrene-maleic anhydride amic acid resin, styrene-maleic anhydride imide resin, ammonium and alkali metal salts of styrene-maleic anhydride resin, polymers based on polyvinyl acetate, copolymers of polyvinyl pyrrolidone, and acrylic copolymers of styrene and acrylic acid. In particular embodiments, the resin is or includes styrene-maleic anhydride.

Suitable solvent choices for solubilizing the alkaline soluble resin include, but are not limited to, aqueous solutions of sodium hydroxide, potassium hydroxide, ammonium hydroxide, monoethanolamine, diethanolamine, triethanolamine, primary amino alcohols, for example; 2-amino-2-methyl-1-propanol, 2-amino-1-butanol, Tris(hydroxymethyl)-aminomethane, and 2-amino-2-ethyl-1,3-propanediol, and additionally, ethylamine and propylamine.

The concentration of the resin can vary depending on the adhesion and tack of the emulsion/dispersion polymer and the continuous phase formation of the resin polymer. If the emulsion polymer is relatively non-tacky/blocky, then less resin polymer can be used. In contrast, if the emulsion polymer is very tacky, more resin polymer is likely needed. The other required properties of the label also need to be considered (e.g., caustic resolubility, ice water resistance, manufacturability, etc.). In some embodiments, the resin polymer is present in an amount of about 75% or less by weight of the adhesive composition, such as about 10% to about 70% by weight, preferably 25% to about 65%, preferably 30% to about 60% by weight. The concentration of the resin can be less than 10% or greater than 75% in view of the requirements/properties discussed above.

b. Emulsion/Dispersion Polymer

The blend or mixture also contains an emulsion or dispersion polymer. This polymer forms a discrete phase dispersed in the continuous phase polymeric resin. The emulsion or dispersion polymer provides the adhesion of the label to the substrate. The film-forming resin encapsulates the emulsion/dispersion polymer to provide a non-tacky surface which allows for storage of the labels as rolls or stacks. However, the blend of the emulsion/dispersion polymer into the non-blocking resin disrupts the continuous polymer film and allows for improved activation of the film by the activation spray to provide the necessary adhesion to affix the label to the substrate. The emulsion or dispersion polymer is generally hydrophobic or more hydrophobic than the resin polymer. The emulsion or dispersion polymer can adhere to the surface through a variety of interactions/mechanisms, including, but not limited to, hydrogen bonding or other intermolecular forces, such as hydrophobic interactions.

Suitable emulsion polymers include, but are not limited to, styrene acrylic emulsion polymers, natural and reclaimed rubbers, polyurethanes, non-carboxylated and carboxylated styrene-butadiene rubbers, polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, butyl methacrylate or combinations of the previous, polyamides, polyesters, polyolefins, polyolefins containing maleic anhydride, polystyrenes, polyvinyl esters, polyvinyl ketones, polydiene elastomers, polyisobutylenes, poly butadienes, polychloroprenes, as well as combinations of the above materials. Other material(s) having the desired long-term adherence characteristic may also be used. In particular embodiments, the emulsion or dispersion polymer is or includes styrene acrylic emulsion polymers.

The concentration of the emulsion/dispersion polymer can vary depending on the adhesion and tack of the emulsion/dispersion polymer and the continuous phase formation of the of the resin polymer. In some embodiments, the emulsion or dispersion polymer is present in an amount of about 40% or greater by weight of the adhesive composition, such as about 50% to about 90% by weight, preferably 50% to about 80%, preferably 60% to about 80% by weight. The concentration of the resin can be less than 40% or greater than 90% in view of the requirements/properties discussed above for the resin and the emulsion/dispersion polymer. The concentration of the resin and/or emulsion dispersion polymer can be varied due to the presence of additives which modify the properties of the adhesive composition.

3. Polymer Properties

The resin, emulsion/dispersion property, and/or copolymer can vary in terms of molecular weight, acid number, and/or glass transition temperature based on the monomers use to form the polymers. In some embodiments, the weight average molecular weight of the resin and/or emulsion/dispersion polymer is from about 5,000 Daltons to 1,000,000 Dalton, preferably from about 5,000 Daltons to about 500,000 Daltons, more preferably from about 5,000 Daltons to about 250,000 Daltons. In some embodiments, the weight average molecular weight is from about 5,000 Dalton to about 30,000 Daltons. In other embodiments, the weight average molecular weight is greater than about 200,000 Daltons. In particular embodiments, the polymer is a styrene-acrylic copolymer having a weight average molecular weight from about 5,000 Dalton to about 25,000 Daltons or greater.

For those copolymers containing acidic functional groups, such as acrylic acid monomers, the acidity of the polymer can be measured by determining the acid number. In those embodiments where the adhesive composition contains an alkaline soluble resin and an emulsion or dispersion polymer, the resin has an acid number from about 75 mg KOH/g polymer to about 500 mg KOH/g polymer, preferably from about 100 mg KOH/g polymer to about 250 mg KOH/g polymer and the emulsion/dispersion polymer has an acid number from about 0 mg KOH/g polymer to about 70 mg KOH/g polymer, preferably from about 40 mg KOH/g polymer to about 60 mg KOH/g polymer.

The glass transition temperature of the polymer typically varies from about −50° C. to about 200° C. In some embodiments, the glass transition temperature is from about −50° C. to about −15° C., from 0° C. to about 10° C., from about 40° C. to about 90° C. or from about 200° C. to about 225° C. In those embodiments where the adhesive composition contains an alkaline soluble resin and an emulsion or dispersion polymer, the resin has a Tg from about 40° C. to about 160° C., preferably from about 100° C. to about 130° C. and the emulsion polymer has a Tg from about +10° C. to about −80° C., preferably from about −10° C. to about −60° C., more preferably from about −15° C. to about −50° C. In general, higher Tg polymers will have better heat-seal blocking resistance but the use of lower Tg emulsion polymers is suitable if the emulsion polymer is entrapped within a continuous phase of a higher Tg alkaline soluble resin.

E. Hygroscopic Particulate Fillers

Hygroscopic particulate fillers can be added to the composition to enhance the adhesive performance of the hydrophobic and hydrophilic materials. The use of such hygroscopic agents is beneficial as a means to enhance the penetration of water into the adhesive layer on a label as well as to control the kinetics of adhesive activation based on the distribution and redistribution of the activation fluid (or solvent) into both the hydrophilic and hydrophobic regions of the adhesive. In order for the adhesives to transition from their non-tacky to tacky state, they require a certain amount of water and/or solvent moisture to be present within the material. The retention of this moisture can be utilized as a mechanism to preserve viscoelastic flow of the polymer layer and in turn create a tacky label. However, excessive moisture can prevent the contact of the adhesive with the substrate by acting as a physical barrier to the generation of adhesive interactions resulting in the migration of the label from the desired application area on a substrate during down-stream processing. An added benefit of the use of hygroscopic agents is their ability to reduce the phenomena of 'blocking' in self-wound rolls of labels having a surface coated with the adhesive composition described herein.

These hygroscopic particulate filler materials are typically available as colloidal suspensions in a variety of solvents or as solids and are incorporated into the final adhesive composition at the desired concentrations. Concentrations of the suspensions are typically in the range of 10% to 90% solids (weight of solids in the suspension to volume of liquid phase of suspension) in either an aqueous or solvent based suspension and present in the final dry film in a ratio from 1% to 25% (weight of dry solids in film as a ratio of other components dry weight in film). However, concentrations below or above this range are possible depending on the composition and/or the desired application.

Care should be taken to prevent the flocculation of these hygroscopic agents during adhesive preparation and storage since these agents are often micro- and nanoparticles, which are prone to aggregation due to their high surface area to volume ratios. Generally, particles within the particulate fillers may have the largest particle dimension between 0.005 μm (micrometers) and 15 μm, more preferably between 0.005 μm and 10 μm, and most preferably between 0.005 μm and 5 μm. As used herein, the term "largest particle dimension" refers to the longest linear dimension between two points on the particle.

Methods to ensure the homogenous distribution of these agents in suspension can include the use of agitation, surfactants, temperature and/or pH. The pre-saturation or treatment of the hygroscopic agents using solvents, water, and/or adhesive components is also possible to alter their affinity for different components of the activating solution.

Suitable hygroscopic particulate fillers include, but are not limited to, alumina, alumina gel, boehmite, pseudoboehmite, clay, calcium carbonate, chalk, magnesium carbonate, kaolin, calcined clay, pyropylate, bentonite, zeolite, talc, silica, silica gel, synthetic aluminum silicates, synthetic calcium silicates, diatomatious earth, anhydrous silicic acid powder, aluminum hydroxide, barite, barium sulfate, gypsum, calcium sulfate, and organic particles, such as hydrophilic and/or hydrophobic polymeric beads including but not limited to polyamides, polyvinyl alcohol, polyvinylpyrrolidone, polyvinylpyrrolidone vinyl acetate and other similar materials as well as combinations of the above materials.

F. Polymer Solvents

Solvent(s) can be added to the composition as means for formulating the copolymer. For example, solvent(s) can be added to mirror the composition of the solution of the activating fluid to enhance the rapid swelling of the label and quick tack adhesion forces following the exposure of the adhesive layer to the activating fluid. By including the chemistry of the activating solution during the deposition process, the surface of the adhesive can be modified to promote the penetration of the activating solution into the adhesive layer for activation. Furthermore, the incorporation of solvents, particularly those that are less viscous and/or have higher vapor pressures, allows for the deposition of more consistent and uniform adhesive films on the labels. Furthermore, some solvents may be able to prevent any adverse effects of the adhesive layer deposition process on the front side of the label, which must remain pristine for optimal label print quality.

Care must be taken to insure that the solvent selected does not damage or deform the substrate being coated. In one embodiment, thermally activated paper is coated with a water based solvent system as primary alcohol, glycols, and acetates tend to damage or activate the thermal ink. Solvents may include, but are not limited to, water, ethanol, isopropanol, n-propanol, methyl ethyl ketone, toluene, methylene chloride, and/or coalescing agents including polyethylene glycol, glycol ethers, and fatty alcohols. In some embodiments, the copolymer is formulated as a water-based emulsion or dispersion.

G. Activating Fluids

The activating fluid composition provides optimal activation of the adhesive component(s) of the layer of adhesive composition of the liner-free label. The activating fluid composition must penetrate into the adhesive layer to moisten the hydrophilic and hydrophobic adhesive monomers without over-wetting the adhesive surface of the label, which can compromise adhesive performance. In addition, the activating fluid composition needs to be compatible with mechanisms for applying activating fluids onto a liner-free label, such as in stand-alone systems, label printers, labeling lines, or other apparatuses. The activating fluid composition should also be safe, non-toxic and comply with the guidelines established by regulatory boards for their intended purpose.

The purpose of the activating fluid (or solution) is to introduce moisture into the adhesive layer to allow for the conversion of the adhesive from its non-tacky to tacky state. However, given the selection of both hydrophilic and hydrophobic adhesive monomers, one must account for the chemistries of the two or more polymers and the solvent used in the deposition process for enabling optimal activation. As described previously, the activating fluid needs to penetrate into the hydrophilic regions of the adhesive layer to generate quick tack then redistribute and remain in the hydrophobic regions to maintain ultimate tack and long-term adhesion.

Suitable solvents include, but are not limited to, water; acetone; acetonitrile; lower alcohols (i.e., having from 1-10 carbons) including, but not limited to, methanol, ethanol, isopropyl alcohol, n-propanol, n-butanol, 2-butanol, isobutanol, 2-methy-2-butanol, n-pentanol, n-hexanol, 2-hexanol, cyclohexanol, n-heptanol, n-octanol, n-nonanol, n-decanol; glycols including, but not limited to, propylene glycol, ethylene glycol, and butylene glycol; fatty alcohols (i.e., having more than 10 carbons) including, but not limited to, undecanol, dodecanol, 1-tetradecanol, arachidyl alcohol, docosanol, tetracosanol, hexacosanol, octanosol, triacontanol, cetyl alcohol, stearyl alcohol, and polycosinol; ketones, such as methyl ethyl ketone; esters, such as lower (i.e., having from 1-10 carbons) acetates including, but not limited to, methyl acetate, ethyl acetate, n-propyl acetate, isopropyl acetate, isobutyl acetate, sec-Butyl acetate, tert-Butyl acetate, 3-methyl-1-butyl acetate; mineral spirits; oils, such as linseed oil and vegetable oil; citrus based solvents, such as limonene, other primary, secondary, and tertiary alcohols, and combinations thereof.

Low volatile solvents, such as ethylene glycol and propylene glycol, are particularly useful in extending the latency period.

Low surface energy solvents, such as isopropyl alcohol are particularly effective in increasing wet out on hydrophobic and/or low surface energy substrates.

The polymer selection for the adhesive formulation can be such that the activation solvent required to activate the label is water. However, selecting polymers that only require water to rapidly transition from non-tacky to active may not be desirable as the finished labels are highly vulnerable to blocking due to absorption of atmospheric moisture, causing a transition from the non-tacky state to the tacky state.

Therefore, in one embodiment, the activating fluid contains at least two or more solvents. The first solvent or component is water or an aqueous solution which allows for rapid wetting and swelling of the hydrophilic regions of the adhesive to generate the quick tack responsible for the initial adhesion of the label to the substrate. However, as the water is drawn into the hygroscopic filler, quick tack is lost and must be replaced by ultimate or long-term tack, derived from the hydrophobic regions, which exhibit some swelling behavior in water. Thus, a second solvent or component is a non-aqueous (non-water) solvent containing hydrophobic chemical moieties which enhances the activation of the hydrophobic regions by increasing the permeability of the activating fluid into these regions. In a particular embodiment, the non-aqueous solvent is partly miscible or fully miscible with water. By using a mixture of solvents, the swelling of the hydrophilic regions can increase the surface area of the hydrophobic regions exposed for solvent penetration, resulting in the more rapid generation of ultimate tack. An optional third solvent or component, which preferably is a volatile material, may be used to aid in the removal of excess moisture from the adhesive layer to promote stronger adhesion.

In one embodiment, the solvent contains between about 1% and about 70%, preferably about 5% to about 70%, more preferably from about 10% to about 60%, most preferably about 10% to about 50% by weight of a non-toxic organic solvent in an aqueous solution. Care should be taken to match the polymer adhesive layer with suitable solvents that will activate the layer within the parameters discussed above. In a particular embodiment, the activation composition is a mixed solvent system with 5-70% w/w alcohol in water, preferably 10-50%, more preferably 20-40%, most preferably about 30% w/w mix of an alcohol in water. However, any polar solvent with some water miscibility containing hydrophobic chemical moieties may also be used. In particular embodiments, the solvent is a mixture of water and n-propanol, isopropanol, or combinations thereof. The concentration of the alcohol(s) can be about 1%, 2%, 5%, 10%, 15%, 20%, 25%, 30%, 35%, or 40% by weight of the fluid.

The solvent system can be varied for a particular adhesive composition in order to vary the properties of the adhesive composition. For example, the examples below show that the activating solvent can be varied to correlate with the selected hydrophilic and/or hydrophobic materials to achieve the desired performance. Generally, a solvent is a liquid fluid that either solubilizes or swells polymeric components of a solvent sensitive film. A non-solvent is a liquid fluid that does not solubilize or swell the polymeric components of a solvent sensitive film. In one embodiment, non-solvent can be incorporated into the activation fluid to reduce the overall average peel adhesion of the label. In another embodiment, solvent with a vapor pressure greater than that of water at a given temperature can be incorporated into the activation fluid to lower the amount of time required to achieve acceptable ultimate adhesion values.

To decrease surface tension, enhance solvent spreading on the adhesive film surface, and/or promote activating solvent penetration, surfactants may be added to the activating fluid. Surfactants may also help in the delivery of the activating fluid by allowing for the creation of finer mists with smaller particle sizes during atomization (when used to apply the activating fluid to the adhesive layer of a label) which can promote adhesive activation by increasing the surface area for the interaction between the activating solution and the adhesive layer. Classes of surfactants that can be used include anionic, cationic, non-ionic and amphoteric surfactants. Specific examples include lecithin, Span™-60, Span™-80, Span™-65, Tween™-20, Tween™-40, Tween™-60, Dynol™ 604 (Air Products), Surfynol™ (Air Products), Pluronics™ (BASF, Germany), Polysorbates™ (Tween™), Sodium dodecyl sulfate (sodium lauryl sulfate), Lauryl dimethyl amine oxide, Cetyltrimethylammonium bromide (CTAB), Polyethoxylated alcohols, Polyoxyethylene sorbitan, Octoxynol™ (Triton X100™), N, N-dimethyl-dodecylamine-N-oxide, Hexadecyl-trimethylammonium bromide (HTAB), Polyoxyl 10 lauryl ether, Brij™ 721™, Bile salts (sodium deoxycholate, sodium cholate), Polyoxyl castor oil (Cremophor™), Nonylphenol ethoxylate (Tergitol™), Cyclodextrins, Lecithin, or Methylbenzethonium chloride (Hyamine™).

H. Other Additives

Additives may incorporated into activating fluid, such as acids, bases, buffers, antimicrobial agents, stabilizers, emulsifiers, and/or defoaming agents, as needed for the particular application.

Other additives may be added into the adhesive composition to modulate the performance of the liner-free labels. These additives may be selected for a variety of purposes, such as enhancing water penetration, reducing blocking, increasing quick tack and/or long-term adhesion as well as improving latency (the time between label activation and application). Potential classes of additives include, but are not limited to, colorants, both dye and pigment based, salts, sugars, other carbohydrates, polyelectrolytes, proteins, dry and liquid surfactants, resins, wetting agents, additive that provide desired lay flat properties of the labels, such as humectants, polyethylene glycol, and/or salts, other similar materials as well as combinations thereof. These additives can be incorporated into one or both of the polymer components, the polymer solvent, the activating fluid, or combinations thereof.

In particular, the use of non-volatile solvents, plasticizers, coalescents, oligomers, and/or polymers in the activation may extend the open time of a given adhesive composition. The additives in the activation spray should not clog the applicator used to apply the activation spray and should not require excessive cleanup.

I. Adhesive Performance

The performance of the adhesive can be evaluated using a variety of assays including block resistance, peel strength, percent fiber tear and label edge peel, tunneling, and/or swimming when immersed in an ice bath. The performance of the adhesive in the peel strength, percent fiber tear and immersion assays can vary depending on the activating fluid used to activate the adhesive. Results of these assays on a variety of adhesive compositions are shown in Table 1 in the examples.

The labels coated with the adhesive compositions described herein exhibit (1) peel ratings of good or excellent, preferably excellent, at two minutes;

(2) percent fiber tear from about 50% to about 100%, preferably greater than about 75%, at two minutes;

(3) heat seal blocking of good or excellent, preferably excellent, which indicates no interaction of the face sheet with the non-tacky adhesive applied to the backside of the sheet. The block test is predictive of how the non-tacky adhesive coating will behave following the coating production step when face sheets stock is kept in roll form prior to converting to sheet form. Ratings of excellent provide for face sheet rolls with no blocking and unwind easily with no damage to face sheet or adhesive coatings.

(4) a rating of pass for the 72 hour ice bucket test for edge lifting, tunneling, and swimming. The label must remain fully adhered and intact after 72 hr treatment; preferably, moderate to strong force must be applied in order to remove the wet label immediately following the ice bucket test. Labels that easily remove, swim, have tunneling and edge lifting receive ratings of fail and are not acceptable;

(5) a rating of pass for the caustic bath test. Labels that receive a pass rating fall off completely while labels that remain adhered after 2 min receive a fail rating. Caustic bath test ratings of pass are preferred with label drop of preferred between 15 sec and 2 min and most preferred between 30 sec and 90 sec. Any adhesive remaining on the glass bottle after the caustic bath test is not acceptable. It is preferred to have not adhesive remaining on the glass following the caustic bath test;

(6) or combinations thereof.

III. Kits

Kits containing the adhesive composition or the components to prepare the adhesive compositions are described herein. In one embodiment, the kit contains, premixed, the copolymer and alkaline soluble resin, as well as any additives. The mixture can be in the form of a solution or suspension in a suitable solvent or an emulsion. Alternatively, the mixture can be a solid, which is formulated into a solution, suspension, or emulsion by the user. In these embodiments, the kit can contain one or more solvents for formulating the adhesive composition. The copolymer, additives, and/or solvents can be provided in appropriate containers, such as drums or totes. The kit may also contain instructions for preparing the adhesive composition as well as instructions for applying it to labels. The kit can also contain the activating solution, which is packaged in a separate container, such as a drum or tote. The activating solution may contain one or more additives solubilized or dispersed in the activating solution. Alternatively, the additives can be added to the activating solution prior to use. In other embodiments, the kit contains the adhesive composition, optionally any additives, and the activating fluid, wherein the adhesive composition and the activating fluid are packaged and/or delivered separately but are used in combination to prepare liner-less labels.

In some embodiments, the adhesive composition and the activating solution are sold to an entity that applies the adhesive composition to labels and sells the treated labels and the activating solution to the final end user. The entity that sells the treated labels and the activating solution to the final end user can package the labels and activating solution with a printing/labeling device, fitted with an aftermarket device to activate the labels, used to print the labels and/or apply them to commercial products. In another embodiment, finished labels, wherein the adhesive composition has been applied prior to packaging of the labels, are provided to the final customer.

In specific embodiments, kits are sold to label coaters/manufacturers. The kits can contain one or more of the following: (1) drums, pails, totes, or other bulk containers containing adhesive to be coated onto a face sheet using a large format web-based coater or printing press or sheet fed printing press; (2) drums, pails, totes, or other bulk containers containing activation fluid to be repackaged into refill stations, reusable containers, or disposable cartridges; (3) refill stations, reusable containers, or disposable cartridges containing activation fluid; (4) wide format rolls or stacks of liner-free labels; and combinations thereof. The elements of the kit can be sold to a single coater/manufacturer or to multiple coaters/manufacturers.

The KRONES Manual of Labeling Technology (Hermann Kronseder Maschinenfabrik, 1978) lists various automated labeling methods that have become increasingly ubiquitous within industry since its publishing. These glue-free, liner-free labels are engineered to be compatible with these methods as well as more modern methods known to one of ordinary skill in the art. In particular, these labels would be compatible with existing cut and stack glue applied labeling machines with simple retrofits to the machinery.

IV. Methods of Making Adhesive Compositions

The copolymer can be packaged individually, along with one or more solvents, and mixed together at a later time.

Alternatively, the polymer can be mixed together to form a blend and dissolved or suspended in a solvent in the form of an emulsion, suspension, or solution. Prior to the preparation of the final adhesive composition, all formulations can be diluted to the desired concentrations with distilled water or appropriate organic solvent.

The desired coating concentration of the formulations is from about 20% wt solids to about 70% wt solids, preferably from about 20% wt solids to about 60% wt solids, more preferably from about or between 25% wt solids and 55% wt solids. Depending on the particular combination of components in the adhesive compositions, the polymer(s) and any additives are mixed together in the appropriate ratios. For example, if the hygroscopic particulate filler to be added is in the form of a colloidal suspension, the copolymer can be mixed into this suspension; if the hygroscopic agent is a solid, it can be added to the copolymer.

V. Methods of Using Adhesive Compositions

The adhesive compositions described herein can be used to adhere glue-free, liner-free labels to a variety of substrates, particularly glass and plastic, such as polyethylene terephthalate. In particular embodiments, the adhesive composition is applied to a printed or printable paper or polymeric film for application to glass or plastic, such as food and beverage bottles and containers, containers for pharmaceutical products, or other storage or consumer containers made from or of glass or plastics.

The labels provides long term label to bottle adhesion when dry and long term adhesion when exposed to ice water condition for extended time periods, particular for substrates having high MVTR values. This is particular important for food and beverage bottles and containers which are stored in ice, such as in coolers. The labels, however, are easily removable in a caustic bath which allows for straightforward label removal and recycling of the glass or plastic container.

EXAMPLES

Examples 1-7

Preparation of Non-Tacky, Label Samples for Block Testing, Adhesive Peel Testing and Coefficient of Friction Testing Alkaline-soluble resins and emulsion polymers used for Examples 1 to 7 are listed in Table 1. Non-tacky, label sample films were prepared at the blend ratios described in Table 2. All label sample films were coated on the backside of wet strength 70 gsm paper stock with a wire wound rod to achieve a coating film weight of approximately 8 g/m$^2$ and dried for 5 min at approximately 110° F.

Blocking Test

Label sample strips, cut to 1.5" by 6", were placed in a Precision Bench Heat Seal Press (Packworld USA, Nazareth, Pa.) with the non-tacky, adhesive layer oriented down on top of the face sheet of a 2" by 6" sample strip. The label samples were treated for 90 sec at 120-122° F. and 60 psi. After testing, the cooled samples were peeled apart. Sample evaluation was based on the level of cling (or interaction) the adhesive coating had for the face stock of the paper label. Samples with no cling received a rating of Excellent. Samples with low level of cling received a rating of Good, while samples with high level of cling resulting in visible damage to the label face stock coating received a rating of Fair. Samples with the greatest amount of cling, resulting in paper tear of the label, received a rating of Poor.

The emulsion polymer in Example 1 received a blocking rating of good. This rating improved to Excellent with the blending of the non-tacky resins as demonstrated in Examples 4 to 7. On their own, resins B and E have Excellent blocking ratings (Examples 2 and 3).

Adhesive Peel Test

The non-tacky, adhesive sides of coated label samples, cut to 1" by 6" rectangles, were sprayed with approximately 6 mg/in$^2$ of activation spray. Activated samples were immediately placed, adhesive side down, on a glass slide or bottle and applied smooth and flat with moderate pressure by a rubber roller. Samples were allowed to sit undisturbed for 2 min or for 10 min after which time the sample strips were peeled from the substrate surface. The 2 min time point is considered to be representative of quick tack performance. Label samples with a high percentage of fiber tear 2 min after application are considered to have a faster quick tack time than label samples that generate a high percentage of fiber tear 10 min after application. Fast quick tack is an important property of beverage labels as the typical time required for labels to generate sufficient tack on a typical bottling line can be on the order of 100-300 msec.

Samples were evaluated based on the failure mode of the sample strip upon peeling. If the applied label sample showed no adhesion to the substrate and peeled off with no interaction, the sample received a rating of Poor. If the applied label sample remained intact but required low amount of effort to remove it from the substrate, the sample received a rating of Fair. If the applied label sample remained intact but required strong effort to remove it from the substrate, the sample received a rating of Good. If the sample exhibited tearing or face stock delamination, the sample received a rating of Excellent.

The percent fiber tear is evaluated for samples that achieve a peel rating of Excellent. It is determined by visually inspecting and estimating the percent of the surface area of the label that remains adhered to the substrate following the removal of the label in a single smooth peel. This assay may be more appropriate since for adhesive labels having an "excellent" rating, the label often tears prior to the adhesive failing.

Label samples allowed to sit for 2 min after application achieved percent fiber tear of 60% to 100% for formulations containing the styrene-maleic anhydride alkaline soluble resin (Examples 4 to 7). Samples without the resin, as in Example 1, did not achieve sufficient adhesion or percent fiber tear 2 min after application. The alkaline soluble resin alone, as in Examples 2 and 3, did not generate enough adhesion, even after 10 min post-application.

Ice Bucket Test

The non-tacky, adhesive sides of coated label samples, cut to 1" by 6" rectangles, were sprayed with approximately 6 mg/in$^2$ of activation spray. The activated samples were immediately placed, adhesive side down, on the glass bottle and with moderate pressure, labels were smoothed and rubbed flat by hand. The samples were allowed to sit undisturbed for 24 hours at room temperature, after which time the bottle was filled with cold water and placed in an ice bath. Following treatment in the ice bath for 72 hours, the sample strips were evaluated based on the failure mode of the label sample. The label samples were evaluated for edge lifting (E), tunneling (T), swimming (S), and complete separation (Fail) from the bottle.

Sample labels composed of emulsion polymer only, as in Example 1, pass the 72 hour ice bucket test. Resin only samples, Examples 2 and 3, were not tested for ice bucket resistance as these samples did not generate enough adhesion as indicated by the Adhesive Peel test results. When the emulsion polymer was blended with the styrene-maleic anhydride ammonium salt resins (Examples 4 and 7), label samples pass the 72 hour ice bucket test. When the emulsion polymer was blended with the styrene-maleic anhydride sodium salt resin (Example 5), label samples did not pass the ice bucket test due to swimming. Blending the emulsion polymer with the pH neutral styrene-maleic anhydride amic acid resin resulted in label sample failure of the ice bucket test due to swimming. When non-volatile resin solutions were used (Polymer C and D), the adhered adhesive film was soluble in the ice water allowing for labels to swim and eventually detach from the glass bottles. When volatile base resin solutions are used (Polymer B and E), the adhered adhesive film is insoluble in the ice water due to the evolution of ammonia during drying of the non-tacky adhesive film.

Caustic Bath Test

The non-tacky, adhesive sides of coated label samples, cut to 1" by 6", were sprayed with approximately 6 mg/in$^2$ of activation spray. Activated samples were immediately placed, adhesive side down, on a glass bottle applied smooth and flat with moderate pressure by hand. Samples were allowed to sit undisturbed for a minimum of 24 hours after activation to allow for the adhesive to set. The glass bottles were immersed in a bath of 4.5% NaOH at ~65-75° C. for 2 minutes during which time the bath was agitated by stir bar. The glass bottles were removed from the caustic bath and each label was evaluated for release from the glass substrates. Samples that fell off from the glass or were easily removed without leaving residue by light shear force applied by one finger were considered to pass the test (pass). The amount of time required for label to drop off the glass bottle during immersion was recorded. Preferred drop off times are 2 min or less. Samples that remained adhered to the glass did not pass the test (fail).

All sample labels passed the caustic drop test (Examples 1, 4 to 7). Samples prepared from resin only were not tested as these samples did not pass the Adhesion Peel Test. For Example 1, however, following the caustic drop test a thin film of emulsion polymer was observed, permanently adhered to the glass. The caustic solution allowed for complete removal of the paper label but the emulsion polymeric film was not soluble in the caustic solution and it remained on the glass bottle. Blending the alkaline soluble resin with the emulsion polymer resulted in complete label drop off and no polymeric residue left on the glass bottle.

TABLE 1

List of Polymeric Emulsion and Alkaline Soluble Resins Used in Examples 1 to 7

| Polymer ID | Polymer | Description | % wt solids (as supplied) | Tg (° C.) | Acid Number (mg$_{KOH}$/g$_{polymer}$) | pH |
|---|---|---|---|---|---|---|
| A | Rovene 6104 [1] | Emulsion Polymer: Styrene acrylic copolymer | 48 | −45 | 50 | 8.1-8.8 |
| B | SMA 1000H [2] | Alkaline Soluble Resin: Styrene maleic anhydride ammonium salt | 39 | +155 | 465-495 | 8.5-9.5 |
| C | SMA 1000HNa [2] | Alkaline Soluble Resin: Styrene maleic anhydride sodium salt | 40 | +155 | 465-495 | 8.0-11.0 |
| D | SMA 1000MA [2] | Alkaline Soluble Resin: Styrene maleic anhydride resin amic acid (pH neutral) | 31 | +155 | 465-495 | 6.8 |
| E | SMA 17352H [2] | Alkaline Soluble Resin: Styrene maleic anhydride ammonium salt | 25 | +255-285 | 125 | 8.0-9.5 |

Footnotes:
[1] Rovene 6104 was supplied by Mallard Creek Polymers.
[2] SMA 1000H, SMA 1000HNa, SMA 1000MA and SMA 17352 were supplied by Total Petrochemicals & Refining Inc.

TABLE 2

Adhesive compositions and performance test results for Examples 1 to 7

| Example | Polymer 1 (% comp) | Polymer 2 (% comp) | Peel Rating and % fiber tear at 2 min | Peel Rating and % fiber tear at 10 min | Heat Seal Blocking | Ice Bucket Test (72 hour) | Caustic Drop |
|---|---|---|---|---|---|---|---|
| 1 | 100% A | — | Fair and 0% | Excellent and 90%-100% | Good | Pass/ Strong adhesion | Pass* (65 sec) |
| 2 | 100% B | — | Poor and 0% | Poor and 0% | Excellent | — | — |
| 3 | 100% E | — | Poor and 0% | Poor and 0% | Excellent | — | — |
| 4 | 45% A | 55% B | Excellent and 100% | Excellent and 100% | Excellent | Pass/ Moderate adhesion | Pass (50 sec) |

TABLE 2-continued

Adhesive compositions and performance test results for Examples 1 to 7

| Example | Polymer 1 (% comp) | Polymer 2 (% comp) | Peel Rating and % fiber tear at 2 min | Peel Rating and % fiber tear at 10 min | Heat Seal Blocking | Ice Bucket Test (72 hour) | Caustic Drop |
|---|---|---|---|---|---|---|---|
| 5 | 45% A | 55% C | Excellent and 60%-70% | Excellent and 100% | Excellent | Fail/swim | Pass (40 sec) |
| 6 | 45% A | 55% D | Excellent and 70%-80% | Excellent and 100% | Excellent | Fail/swim | Pass (40 sec) |
| 7 | 45% A | 55% E | Excellent and 90%-100% | Excellent and 100% | Excellent | Pass/Moderate-strong adhesion | Pass (45 sec) |

*While this label composition passed the caustic drop test, a film of emulsion polymer, also called ghosting, remained adhered to the glass bottle following the test.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A method for applying a liner-free label to a substrate, wherein the label comprises a non-tacky polymeric coating on a face sheet, the method comprising:
    activating the polymeric coating with an activating fluid comprising water and one or more organic solvents to form a tacky coating, and
    contacting the label to the substrate,
    wherein the polymeric coating comprises one or more alkaline soluble polymers selected from the group consisting of styrene-maleic anhydride resins, esters of styrene-maleic anhydride resins, styrene-maleic anhydride amic acid resins, styrene-maleic anhydride imide resins, ammonium and alkali metal salts of styrene-maleic anhydride resins, and combinations thereof and one or more emulsion polymers,
    wherein the alkaline soluble polymer is water-insoluble at neutral pH.

2. The method of claim 1, wherein the emulsion polymer comprises a styrene-acrylic polymer.

3. The method of claim 1, wherein the substrate is glass.

4. The method of claim 1, wherein the substrate is wood or manufactured wood.

5. The method of claim 1, wherein the substrate is polyethylene terephthalate.

6. The method of claim 1, wherein the face sheet is printed or printable paper.

7. The method of claim 1, wherein the face sheet is a printed or printable polymeric film.

8. The method of claim 1, wherein the one or more organic solvents are one or more low boiling alcohols.

9. The method of claim 8, wherein the activation fluid composition comprises 5% to 70% by weight of one or more low boiling alcohol(s).

10. The method of claim 9, wherein the activation fluid composition comprises 10% to 30% by weight of one or more low boiling alcohol(s).

11. The method of claim 8, wherein at least one low boiling alcohol is n-propanol or isopropanol.

12. The method of claim 1, wherein the label has greater than 70% paper tear after 2 minutes.

13. The method of claim 12, wherein the label has greater than 80% paper tear after 2 minutes.

14. The method of claim 13, wherein the label has greater than 90% paper tear after 2 minutes.

15. The method of claim 1, wherein the label exhibits no blocking after 90 seconds at 60 psi and 48° C.

16. The method of claim 1, wherein the label exhibits no label drop-off after 72 hours immersed in ice water.

17. The method of claim 1, wherein the label exhibits complete label drop-off after soaking in 0.5% to 5% sodium hydroxide solution at 65° C. to 75° C. for less than 5 minutes.

18. The method of claim 1, wherein the label exhibits no label drop-off after 72 hours immersed in ice water and has complete label drop-off after soaking in 0.5% to 5% sodium hydroxide solution at 65° C. to 75° C. for less than 5 minutes.

19. The method of claim 1 wherein the alkaline soluble polymer comprises styrene-maleic anhydride resins.

20. The method of claim 1, wherein the face sheet has a moisture vapor transmission rate of at least about 160 g/m²/24 hr.

\* \* \* \* \*